(No Model.)
H. JOHNSON.
DEVICE FOR BINDING CORN SHOCKS.
No. 502,672. Patented Aug. 1, 1893.
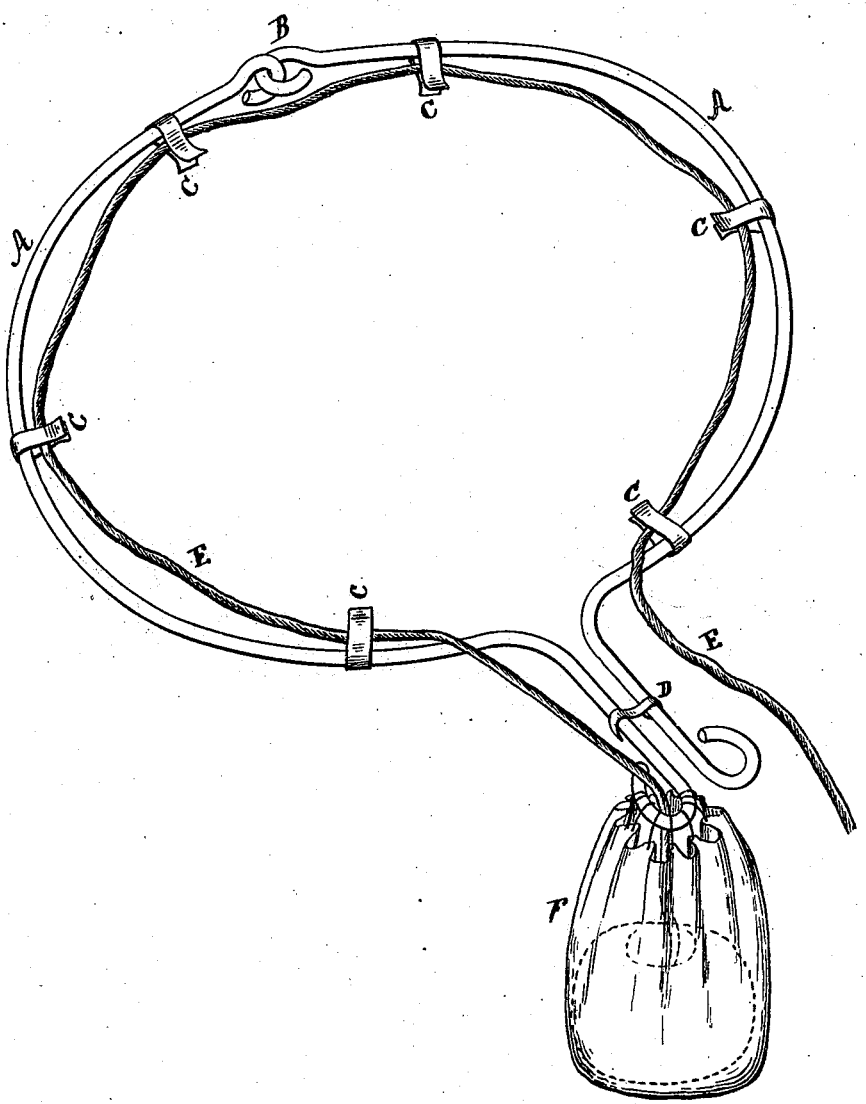
WITNESSES:
S. G. Barnes
H. N. Kirkpatrick
Hamilton Johnson,
INVENTOR,
By James Godfrey,
Attorney.

UNITED STATES PATENT OFFICE.

HAMILTON JOHNSON, OF DENNISON, OHIO, ASSIGNOR TO JAMES GODFREY, OF PITTSBURG, PENNSYLVANIA.

DEVICE FOR BINDING CORN-SHOCKS.

SPECIFICATION forming part of Letters Patent No. 502,672, dated August 1, 1893.

Application filed January 21, 1893. Serial No. 459,270. (No model.)

*To all whom it may concern:*

Be it known that I, HAMILTON JOHNSON, a citizen of the United States, residing at Dennison, in the county of Tuscarawas and State of Ohio, have invented certain new and useful Improvements in Devices for Binding Corn-Shocks; and I do declare the following to be a full, clear, and exact description of the invention, such as will enable others skilled in the art to which it appertains to make and use the same, reference being had to the accompanying drawing, and to the letters of reference marked thereon, which form a part of this specification.

My invention relates to an improvement in devices for binding corn-shocks and consists of two semi-circular pieces of heavy wire hinged together and provided with clamps for holding the twine with which the shocks are bound.

To enable others skilled in the art with which my invention is most nearly connected to make and use it, I will proceed to describe its construction and operation.

In the accompanying drawing which forms part of this specification A. A. represent two semi-circular pieces of heavy wire hinged at B. To these pieces A. A. are attached clamps C. C. C. C. C. C. for holding the cord or twine in position preparatory to binding the shocks.

D is a hook or clasp used for holding pieces A. A. securely together while the operator is tying the cord. F represents a bag for holding the ball of twine E.

The operation of my improvement is as follows: The cord or twine E being placed in the clamps C. the operator opens out the pieces A A and surrounds the shock and then draws the pieces A together and by means of the hook D holds them securely together while the operator proceeds to tie the cord which while being tied will be released from the clamps C. The operator then unloosens the pieces A. A and proceeds to bind other shocks.

It will readily be seen that a device such as is herein described and shown will be very cheap and efficient and easy to operate.

Having thus described my improvement, what I claim is—

A device for binding corn shocks. consisting of two semi-circular pieces of wire hinged together and provided with clamps for holding the twine in position, also hook or clasp for holding the two semi-circular pieces together, and the bag for holding the ball of twine, all substantially as described.

In testimony whereof I affix my signature in presence of two witnesses.

HAMILTON JOHNSON.

Witnesses:
E. A. PARRISH,
R. C. FORD.